Jan. 5, 1943. J. D. CARTER 2,307,389
CONVEYER
Filed April 2, 1941 3 Sheets-Sheet 1
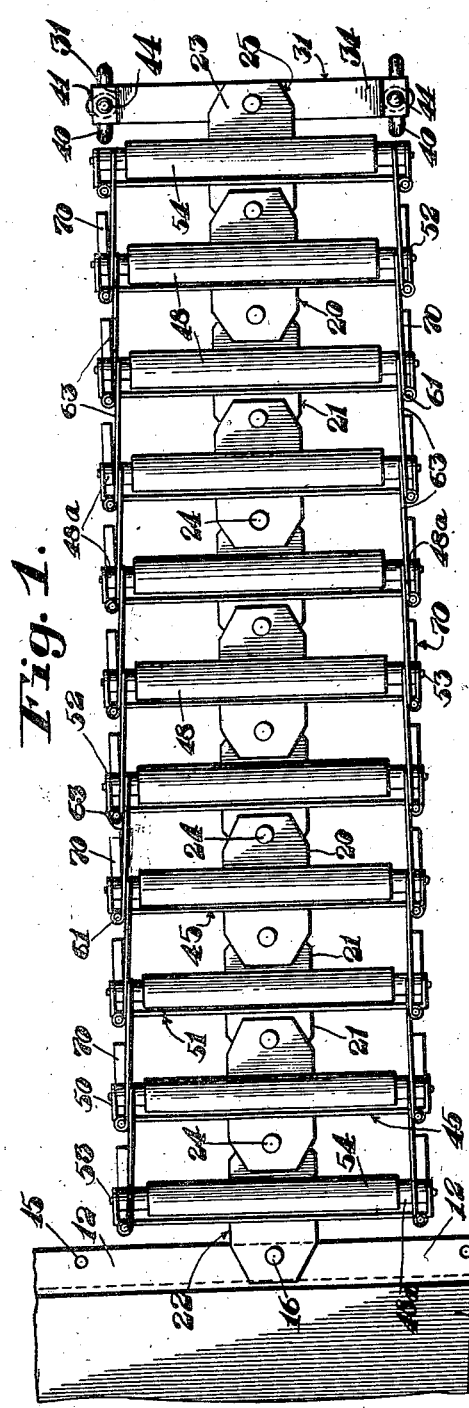
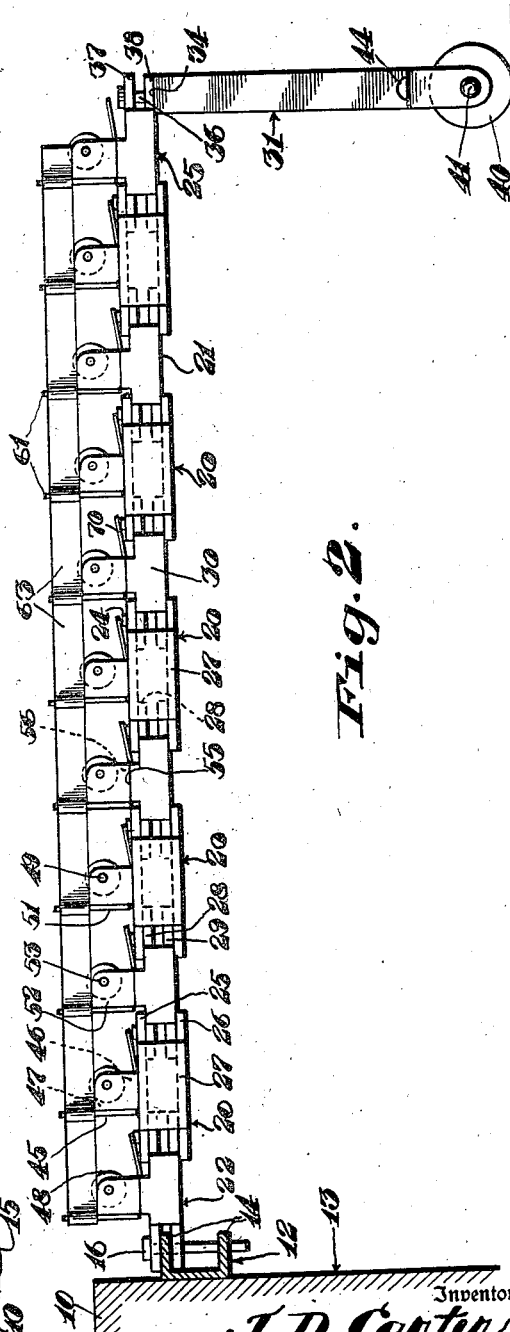
Inventor
J. D. Carter
Munn, Anderson & Liddy
Attorney

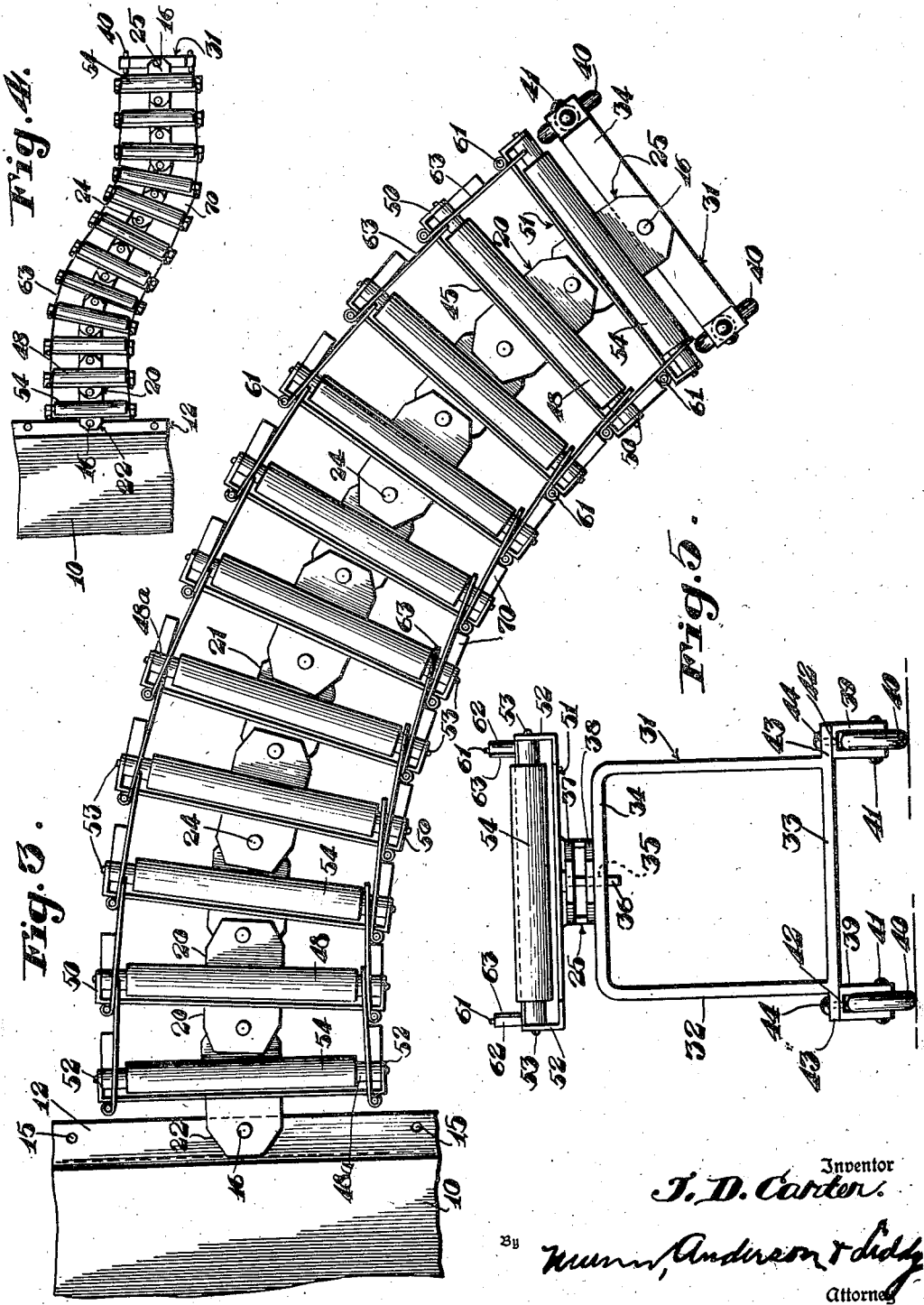

Jan. 5, 1943.　　　　J. D. CARTER　　　　2,307,389
CONVEYER
Filed April 2, 1941　　　3 Sheets-Sheet 3

Inventor
J. D. Carter

Patented Jan. 5, 1943

2,307,389

UNITED STATES PATENT OFFICE 2,307,389

CONVEYER

John D. Carter, Richmond, Va.

Application April 2, 1941, Serial No. 386,541

11 Claims. (Cl. 193—35)

This invention relates to a conveyer.

An object of the invention is the provision of a conveyer which is flexible in a substantially horizontal plane so that one end of the conveyer may be connected to a fixed support, while the conveyer may be disposed at a right angle to the fixed support, whereby articles may be moved by gravity over the support in a straight line for loading the materials on a truck, or for unloading materials from trucks, said conveyer may be curved so that the free end of the conveyer which is supported by a wheeled truck may be moved to various points for the purpose of loading or unloading materials.

Another object of the invention is the provision of a conveyer for loading or unloading materials, or for transporting materials from one point to another in which one end of the conveyer may be connected to a fixed support, while the body of the conveyer may be curved so that the free end may be positioned at various points at either side of a line at right angles to the fixed support, the free end of the conveyer being supported by a wheeled truck, one or more of the conveyers being capable of having an overhead suspension with one end being movable between various points and located above the first-mentioned conveyer.

A further object of the invention is the provision of a conveyer which is flexible in a horizontal plane and which is simple in construction but firmly built for carrying heavy loads in which one or both ends is supported by a wheeled truck so that the ends of the conveyer may be placed in various positions whereby one end of the conveyer may be moved into operative position with a warehouse, while the other end may be moved to different positions to aline with a plurality of trucks for loading or unloading purposes and vice versa.

A still further object of the invention is the provision of a flexible conveyer which is capable of being bent along an arc of a single curve or a plurality of curves so that the ends of the conveyer may be moved to any one of a plurality of positions for transporting goods from one place to another.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a plan view of a conveyer constructed in accordance with the principles of my invention.

Figure 2 is a side elevation of the conveyer as shown in Fig. 1.

Figure 3 is a plan view of the conveyer showing one curved position of the conveyer for loading or unloading at one side of a straight line.

Figure 4 is a reduced view in plane of the conveyer showing a variation of the curvature of the conveyer similar to that shown in Fig. 3.

Figure 5 is a front end view of the conveyer.

Figure 6 is a fragmentary enlarged plan view of the conveyer when curved in a horizontal plane.

Figure 7 is a vertical section taken along the line 7—7 of Fig. 6.

Figure 8 is an end view in elevation of a modified form of the conveyer with an overhead suspension.

Figure 9 is a fragmentary side view partly in section of the conveyer with the overhead suspension.

Referring more particularly to the drawings, 10 designates a platform or a fixed support from which materials are adapted to be transported to a remote point by a conveyer about to be described. A channel bar 12 is secured to the front wall 13 of the platform 10 adjacent the upper end. The parallel flanges 14 of the channel bar 12 are located horizontally and are provided with alined passages 15 which are adapted to receive the pin 16 for connecting one end of the conveyer 11 to the platform.

A plurality of links 20, 21, 22 and 23 are pivotally connected together by pins 24. Each link 20 is formed of a pair of parallel metal plates 25 and 26. The side edges of these plates are connected together by bars 27 which terminate short of the ends of the links and are welded or secured to the plates 26 in any approved manner. It will be noted that a bar is located at each of the side edges of the plates 25 and 26. The opposite ends of both plates are perforated to receive the pins 24.

The link 21 consists of a pair of spaced parallel plates 28, 29 and a pair of bars 30 are secured to the side edges of the plates 28 and 29 so that the plates 28 and 29 and the bars 30 form a substantially integral construction. It will be noted that the plates 28 and 29 are located closely to each other so that the opposite ends of the plates will be neatly received between the adjacent ends of the plates 25 and 26 of the link 20.

The link 22 is provided with a perforation to receive the pin 16 whereby one end of the conveyer 11, as previously stated, is connected to the channel bar 12.

Since the plates 25 and 26 of the links 20 are in close association with the ends of the plates 28 and 29 of the links 21 and since these plates are relatively broad the links will support the conveyer in substantially a horizontal plane and will sustain a considerable load.

A wheeled truck, generally designated by the numeral 31, consists of a U-shaped frame 32 which has a lower transverse bar 33, a top cross bar 34 and the top cross bar is provided with a passage 35 which receives the pin 36 passing through perforations in plates 37, 38 of the link 23.

A pair of U-shaped brackets 39 receive wheels 40 mounted on axles 41 carried by the lower end of the U-shaped member. The bight portions 42 are swivelly mounted on the projecting ends 43 of the bar 33 as shown at 44 so that the wheels 40 are universally mounted and may be turned in any direction desired.

An L-shaped casing 45 has its bottom flange 46 secured to the top plate 25 of each of the links 20 while the metal flange 47 or side wall is located in protected relation with a roller 48 which has trunnions 49 mounted in end walls 50 of the casing. The roller 48 extends above above the upper edges of the end walls 50 and the upper edges of the walls 47 so that articles which are being moved over the conveyer will clear the upper edges of said walls.

The L-shaped members, generally designated by the numeral 51, are secured to the upper faces of the links 21. The upper edges of the side walls 52 of said L-shaped members are located in the same horizontal plane as the upper edges of the side walls 47 of the L-shaped members 45. These end walls 50 of the members 51 also provide bearings for trunnions 53 of rollers 54.

It will be noted that the reinforcing or side bars 30 of the links 21 extend upwardly as shown at 55. The upper edges of these bars are in the same horizontal plane with the upper edges of the bars 27 of the links 20. The lower edges of the bars 30 are also in the same horizontal plane with the upper faces of the bars 27 of the links 20. In order to reinforce the connection between the L-shaped members 51 and the respective links 21 a block of metal may be located between the bottoms 56 of the L-shaped members 51 and the tops of the plates 28 of the links 21. However, the plates 28 and 29 and the reinforcing end bars 30 of the links 21 may be preferably cast in one piece and a rectangular boss 60 will be formed integrally with the outer face of the plate 28 so that the base portions 56 of the L-shaped casings 51 will be riveted or welded directly to said boss.

For practical purposes the elements of the links 20 may be cast as one piece. However, the longitudinal axis of the rollers 48 and 54 will all be in the same plane.

A pin 61 is secured to the opposite ends of each of the rear walls of the L-shaped casings 45 and 51 and these pins extend above the upper edges of the walls 47 and 52 sufficiently to receive bearings 62 of guides 63. These guides are pivotally mounted on the upper ends of the pins at each side of the conveyer and are located in overlapping relation as shown in Figs. 1 and 6. The lower edges of the guides rest upon the upper edges of the walls 47 and 52 of the L-shaped members 45 and 51. The free ends of the guides extend in a direction from their pivots in the line of travel of products which are transported on the conveyer and they combine to act as a side rail to prevent products from being discharged off the conveyer.

A careful study of the conveyer shown in Figs. 1 to 7, inclusive, will show that the links are so constructed that they will support the rollers either in a horizontal plane or in an inclined plane from the loading platform 10 to the discharge end which is carried by the wheeled truck 31 so that articles may be moved upon the conveyer whereby they will travel by gravity over the rollers to the opposite end of the conveyer where they are discharged either upon a truck or a loading platform for filling a storage warehouse.

Each of the platforms are provided with channel bars 12 with perforations 15 to receive the pin 16 for securing one end of the conveyer in position. Since the opposite end of the conveyer is supported by the wheeled truck 31 it may be moved to various positions. However, that end of the conveyer which is connected to the channel member 12 by the pin 16 may also be shifted to various positions in front of the truck or in front of a storage warehouse.

The conveyer may be bent in a horizontal plane, as shown in Figs. 3, 4 and 6, in any desired manner, but means is provided for limiting the curving of the conveyer. This means includes rods or bars 70 which are secured to the bottoms 46 and 56 of the L-shaped members 45 and 51 respectively. The ends of the bars or rods, as shown in Figs. 3 and 6 are adapted to engage the walls 47 and 52 of the L-shaped members 45 and 51 respectively just inwardly of the lower ends of the pins 61 where they are secured to said walls. Such engagement of the free ends of the members 70 with the lower ends of the pins 61 and the side walls will prevent further curving of the conveyer.

In Figs. 3 and 6 the conveyer is shown curved in one direction, while in Fig. 4 the conveyer is shown as being curved in opposite directions. Thus, it will be seen that where the conveyer in Fig. 4 is connected to the loading platform 10, the opposite end may be curved in the same direction as the conveyer is turned in Fig. 3, but the free end of the conveyer may then be reversely curved in order that the wheeled truck, generally designated by the numeral 31, will be located in parallel relation with either a truck on which the products are being loaded, or in parallel relation with the front wall of a loading platform adjacent to another warehouse where products are being transported from one warehouse to another, or from one part of the building to another.

As shown in Figs. 8 and 9 the conveyer may have an overhead suspension for transporting goods from an upper floor of one building to another, or the goods may be transported from an upper floor of a warehouse to trucks which are operating on a raised platform or roadbed while a conveyer may be located beneath the suspended conveyer.

For the purpose of supporting the conveyer I have provided a yoke 75 which is made of metal and which has a lower transverse bar 76 provided with a perforation 77 to receive a pin 78 which passes through alined perforations in the end link 25.

A rod 79 is connected at one end to the upper bar 80 of the yoke 75 while the other end is secured to an axle 81 carrying rollers 82. These rollers travel in an arcuately shaped track 83 which has a slot 84 at its bottom face through which the rod 79 projects. This track is secured to a fixed part of the building. All of the other parts of the conveyer, however, are identical in construction with the parts shown in Figs. 1 to 7, inclusive.

The yoke 75 is of sufficient dimensions to permit the discharge of products therethrough just before they leave the end of the overhead conveyer.

The conveyer is simply constructed, but, nevertheless, it is made sufficiently strong to carry heavy loads without causing breakage or warping or bending of the various parts.

Since the end bars 27 and 30 of the respective links 20 and 21 are welded to the associated parallel plates or since these links may be cast as a unit the links will maintain all parts of the conveyer in the same plane during the loading or unloading operation whereby the articles may move by gravity over the rollers mounted on the conveyer. The L-shaped casings aid in reinforcing the links where they are rigidly connected to the upper faces of the links 20, 21, 22 and 25.

The free end of each guide 63 where it overlaps a preceding or succeeding guide member engages that portion of the associated guide where it is pivoted on a pin 61 so that the guides will be prevented from moving outwardly and away from the side edges of the conveyer.

Collars 48a may be placed on the trunnions of the various rollers for maintaining said rollers in proper spaced relation with respect to the bearing supporting said rollers.

I claim:

1. A movable conveyer unit comprising a plurality of links pivotally connected together at the opposite ends thereof, L-shaped casings secured intermediate the ends thereof to each of the links and located at right angles to the links, said casings having bearings at opposite ends thereof, a roller located within each casing and provided with trunnions mounted in the bearings, the upper surface of each roller projecting above the casings so that the load moved over the conveyer will contact only the rollers, means supporting the opposite ends of the conveyer and guides pivotally connected to the opposite ends of the casings for retaining the load on the conveyer.

2. A movable conveyer unit comprising a plurality of links pivotally connected together at the opposite ends thereof, said links at each end having spaced bearing contacts with each other, L-shaped casings secured intermediate the ends thereof to each of the links and located at right angles to the links, said casings having bearings at opposite ends thereof, a roller located within each casing and provided with trunnions mounted in the bearings, the upper surface of each roller projecting above the casings so that the load moved over the conveyer will contact only the rollers, means supporting the opposite ends of the conveyer and guides pivotally connected to the opposite ends of the casings for retaining the load on the conveyer.

3. A movable conveyer unit comprising a plurality of links pivotally connected together at the opposite ends thereof, L-shaped casings secured intermediate the ends thereof to each of the links and located at right angles to the links, said casings having bearings at opposite ends thereof, a roller located within each casing and provided with trunnions mounted in the bearings, the upper surface of each roller projecting above the casings so that the load moved over the conveyer will contact only the rollers, means supporting the opposite ends of the conveyer, and guides pivotally connected to the opposite ends of the casings for retaining the load on the conveyer, said conveyer being bendable in a horizontal plane, and means for limiting the curvature of bending of said conveyer.

4. A movable conveyer unit comprising a central longitudinal articulated supporting member, means for connecting one end of the member to a fixed support, means movably supporting the other end of said member, said member being adapted to be curved in a plurality of different directions in a horizontal plane but incapable of flexing in a vertical plane, said articulate member consisting of a plurality of alternately disposed pairs of links, one link of each pair being composed of a central longitudinal disposed solid body portion having broad flat ears extending in spaced relation from each end of the body, the other link of each pair having a solid body portion with pairs of spaced ears extending from each end of the said body, the first-mentioned ears lying between and in flat contact throughout substantially their lengths with the inner faces of the second mentioned ears, and means pivotally connecting the overlapping ears together, the first mentioned ears being substantially as long as the associated body so that the links when in a horizontal plane will not flex in a vertical plane.

5. A movable conveyer unit comprising a central longitudinal articulated supporting member, means for connecting one end of the member to a fixed support, means movably supporting the other end of said member, said member adapted to be curved in a plurality of different directions in a horizontal plane but incapable of flexing in a vertical plane, said articulate member consisting of a plurality of alternately disposed pairs of links, one link of each pair being composed of a central longitudinally disposed solid body portion having broad flat ears extending in spaced relation from each end of the body, the other link of each pair having a solid body portion with pairs of spaced ears extending from each end of the said body, the first-mentioned ears lying between and in flat contact throughout substantially their lengths with the inner faces of the second mentioned ears, means pivotally connecting the overlapping ears together, the first mentioned ears being substantially as long as the associated body so that the links when in a horizontal plane will not flex in a vertical plane, spaced rollers located transversely of the articulated supporting member, and means for rotatably supporting the rollers and carried by the second mentioned links.

6. A movable conveyer unit comprising a central longitudinal articulated supporting member, means for connecting one end of the member to a fixed support, means movably supporting the other end of said member, said member adapted to be curved in a plurality of different directions in a horizontal plane but incapable of flexing in a vertical plane, a plurality of spaced rollers, spaced means secured transversely of the supporting member and provided with means for revolubly carrying said rollers, a plurality of guide members pivoted on the opposite ends of the spaced carrying means for the rollers for preventing the loss of products transported on the conveyer.

7. A movable conveyer unit comprising a central longitudinal articulated supporting member, means for connecting one end of the member to a fixed support, means movably supporting the other end of said member, said member adapted to be curved in a plurality of different directions in a horizontal plane but incapable of flexing in a vertical plane, a plurality of spaced rollers, spaced means secured transversely to the supporting member and provided with means for revolubly carrying said rollers, a plurality of guide members pivoted on the opposite ends of the spaced carrying means for the rollers for preventing the loss of products transported on the conveyer, the free end of one guide member overlapping the pivoted end of an adjacent guide member so that the guide members will be maintained in alinement at the side edges of the conveyer, and means for limiting the flexing of the supporting member in a horizontal plane.

8. A movable conveyer unit comprising a central longitudinal articulated supporting member, means for connecting one end of the member to a fixed support, means movably supporting the other end of said member, said member adapted to be curved in a plurality of different directions in a horizontal plane but incapable of flexing in a vertical plane, a plurality of spaced rollers, spaced means secured transversely to the supporting member and provided with means for revolubly carrying said rollers, a plurality of guide members pivoted on the opposite ends of the spaced carrying means for the rollers for preventing the loss of products transported on the conveyer, and a bar projecting from each spaced means for carrying the roller and engageable with a succeeding spaced means for limiting the flexing of the supporting member in a horizontal plane.

9. A movable conveyer unit comprising a central longitudinal articulated supporting member consisting of links having their adjacent ends snugly interfitted within each other and pivoted together, the interfitted portions of the links having a surface area substantially equal to the surface area of the intermediate body portion in order to prevent flexing in a vertical plane, means for connecting one end of the member to a fixed support, means movably supporting the other end of said member, said member adapted to be curved in a plurality of different directions in a horizontal plane, a plurality of spaced rollers, and rigid transverse members secured in spaced relation on the supporting member, the ends of the transverse members being provided with bearings for mounting the rollers, the contacting surface areas of the links being maintained substantially uniform when the articulated supporting member is curved in a horizontal plane in a plurality of different directions.

10. A movable conveyer unit comprising a central longitudinal articulated supporting member consisting of links having their opposite ends slotted with the slotted ends of adjacent links being pivotally and snugly interfitted, the slotted portions of each link having a greater surface area than the remaining portion to provide a rigid linkage capable of curving in a plurality of different directions in a horizontal plane but incapable of flexing along a vertical plane, spaced transversely disposed rollers on the supporting member, spaced means secured to the supporting member and rotatably carrying said rollers, and guide members pivoted for horizontal swinging on each carrying means, the guide members on one carrying means having the free ends resting on the next adjacent carrying means and cooperating with the interfitted ends of the links for preventing flexing of the supporting member along a vertical plane.

11. A movable conveyer unit comprising a central longitudinal articulated supporting member consisting of links pivotally joined together at the adjacent ends thereof, alternate links having a pair of spaced ears at each end, the opposite ends of the other links being fitted snugly between the adjacently disposed ears of the alternate links, the interfitted portions of the links at all times having a greater contacting area than the area of the respective body portions of the links to provide a rigid linkage capable of curving in a horizontal plane but incapable of flexing along a vertical plane and spaced rollers supported tarnsversely of the linkage for the conveyance of articles, alternate groups of the links being in substantially the same horizontal plane.

JOHN D. CARTER.